US009311638B1

(12) United States Patent
Daniel (10) Patent No.: US 9,311,638 B1
(45) Date of Patent: Apr. 12, 2016

(54) APPARATUS, SYSTEM AND METHOD FOR PRE-AUTHORIZING INTERNATIONAL USE OF A CREDIT CARD USING AN ELECTRONIC CARD CASE

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 34 days.

(21) Appl. No.: 14/017,191

(22) Filed: Sep. 3, 2013

Related U.S. Application Data

(60) Provisional application No. 61/696,045, filed on Aug. 31, 2012.

(51) Int. Cl.
*G06Q 40/00* (2012.01)
*G06Q 20/34* (2012.01)

(52) U.S. Cl.
CPC .................................. *G06Q 20/354* (2013.01)

(58) Field of Classification Search
CPC ..... G06Q 20/341; G06Q 20/32; G06Q 20/40; G06Q 20/10; G06Q 20/3224; G06Q 20/20; G06Q 20/322; G07F 7/1008; G07F 7/0886; G07C 9/00087; G07C 2009/00095
USPC ......................................................... 235/379
See application file for complete search history.

(56) References Cited

U.S. PATENT DOCUMENTS

| 5,402,095 | A | 3/1995 | Janniere |
| 8,444,053 | B2 | 5/2013 | Harris |
| 2004/0117514 | A1 | 6/2004 | Nelms et al. |
| 2005/0053264 | A1* | 3/2005 | Amano et al. ................ 382/115 |
| 2005/0077348 | A1* | 4/2005 | Hendrick ....................... 235/380 |
| 2005/0247797 | A1* | 11/2005 | Ramachandran ............. 235/492 |
| 2009/0015371 | A1* | 1/2009 | Bocquet et al. ................ 340/5.2 |
| 2009/0150294 | A1* | 6/2009 | March et al. ..................... 705/67 |
| 2010/0071031 | A1* | 3/2010 | Carter et al. ...................... 726/2 |

OTHER PUBLICATIONS

Office Action, U.S. Appl. No. 13/769,439 dated Nov. 19, 2015, 8 pages.

* cited by examiner

*Primary Examiner* — Tae Kim
(74) *Attorney, Agent, or Firm* — Carol N. Green Kaul, Esq.

(57) ABSTRACT

The present invention is directed to an apparatus, system and method for pre-authorizing international use of an electronic credit or debit card (collectively "payment card") using an electronic card case with biometric verification means for validating the card holder's biometric sample. Card holder may select a payment card housed within the electronic card case, which releases the selected payment card for use upon validation of the biometric sample and also causes the activation of the locator unit positioned within to determine location information for the electronic card case and by extension the selected payment card. The electronic card case's processor transforms the geographical location information into pre-authorized location information for the selected payment card, to now include the geographical location and identifying card account information and the electronic card case communication means transmit the pre-authorized location information to the issuing bank for pre-authorization of the international financial transaction.

32 Claims, 5 Drawing Sheets

APPARATUS, SYSTEM AND METHOD FOR PRE-AUTHORIZING INTERNATIONAL USE OF A CREDIT CARD USING AN ELECTRONIC CARD CASE

PRIORITY CLAIM

This patent application is a Continuation-in-Part patent application and claims priority under 35 U.S.C. §119(e), to U.S. Provisional Patent Application Ser. No. 61/696,045 titled "Apparatus System and Method for Validating Authority for International Use of a Credit Card," filed Aug. 31, 2012. The entire disclosure of the afore-mentioned patent application is incorporated by reference as if fully stated herein.

FIELD OF THE INVENTION

The present invention is directed to an apparatus, system and method for pre-authorizing international use of an electronic credit or debit card (collectively "payment card") using an electronic card case with biometric verification means for validating the card holder's biometric sample. Card holder may select a payment card housed within the electronic card case, which releases the selected payment card for use upon validation of the biometric sample and also causes the activation of the locator unit positioned within to determine location information for the electronic card case and by extension the selected payment card. The electronic card case's processor transforms the geographical location information for the electronic card case and by extension the electronic payment card into pre-authorized location information for the selected payment card, which now includes the card's geographical location and identifying card account information, and the electronic card case communication means transmit the pre-authorized location information to the issuing bank for pre-authorization of the international financial transaction.

BACKGROUND OF THE INVENTION

When travelling internationally, many electronic card holders desire access to their funds and/or the ability to use their payment cards in transacting business overseas. Doing so may not be as easy as it should be, because banks are very concerned about fraud and their inability to recoup for fraudulent international losses. To that extent, banks have stricter controls for international usage, often requiring advance notification of the electronic card holder's trip and international destination prior to allowing the international financial transaction even if funds or credit are available. In reality, the payment card holder may not always remember to inform the issuing bank in a timely manner prior to his/her international trip and is therefore subject to experiencing declined credit or debit card transaction overseas. Once the transaction is declined, obtaining further authorization is a hassle and may require a telephone conversation for oral verification of account information prior to the bank releasing funds or allowing use of the payment card. This process may be satisfying to the bank but to the electronic card holder, oral verification will cause confidential personal information, e.g. social security number in part, or wholly, birthdate, etc., to be publicly disclosed. Thus, there needs to be an apparatus, system and method for validating authorization for international use of an electronic payment card that is easy, with minimal inconvenience to the electronic card holders, yet secure.

Accordingly, the various embodiments and disclosures described herein satisfies these long felt needs and solves the limitations of the prior art in a new and novel manner.

SUMMARY OF THE INVENTION

The apparatus, system and method disclosed herein allow the payment card holder to store as many payment cards as there are card slots within an electronic card case, which provides for a pre-authorized notification to be sent to an issuing bank alerting the issuing bank of a proposed payment card transaction to be transacted in a foreign country prior to the payment card being used. The payment card holder will need to first register a valid biometric sample, which gets stored as a biometric identifier on the electronic card case. In some embodiments, the issuing bank for the electronic card case or the payment card also stores a copy of the biometric identifier. Because the biometric identifier as registered is unique to the card holder even if the electronic card case is lost with the payment cards stored within, the payment cards will remain unauthorized for international use.

In an exemplary embodiment, the electronic card case houses up to three payment cards and includes a locator unit, which orients itself and determines the exact location of the electronic card case and consequently, the electronic payment card(s) housed within. In some embodiments, the issuing bank also stores a copy of the biometric identifier.

Contemporaneous to international use of any of the payment cards stored within the electronic card case, the user first submits a biometric sample, which is authenticated against the biometric identifier. If the electronic card holder's identity is successfully authenticated, the payment card holder may select a payment card housed within the electronic card case, which releases the selected payment card for use causing the activation of the locator unit positioned within to determine the geographical location of the electronic card case and by extension the selected payment card. The card case's processor transforms the geographical location information into pre-authorized location information for the selected payment card, which now includes the payment card's geographical location and identifying card account information, which is transmitted to the issuing bank for pre-authorization of the international financial transaction. The issuing bank receives notification that the card is being selected for use in the location country as identified by the electronic card case's locator unit. In this manner, no additional authorization is necessary to allow international use of the payment card and the card holder is spared the embarrassment of having his/her payment card declined. Additionally, the bank is notified of the authorized use in the international country in an easy, efficient and timely manner.

The following discussion describes in detail, varied embodiments of the apparatus, system and methods disclosed herein. However, this discussion should not be construed, as limiting the invention to those particular embodiments, as practitioners skilled in the art will appreciate that the apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

BRIEF DESCRIPTION OF THE DRAWINGS

Further objectives and advantages of the system and method may be derived by referring to the detailed descrip

DETAILED DESCRIPTION OF THE PREFERRED EMBODIMENT

Apparatus

Figure 1A:
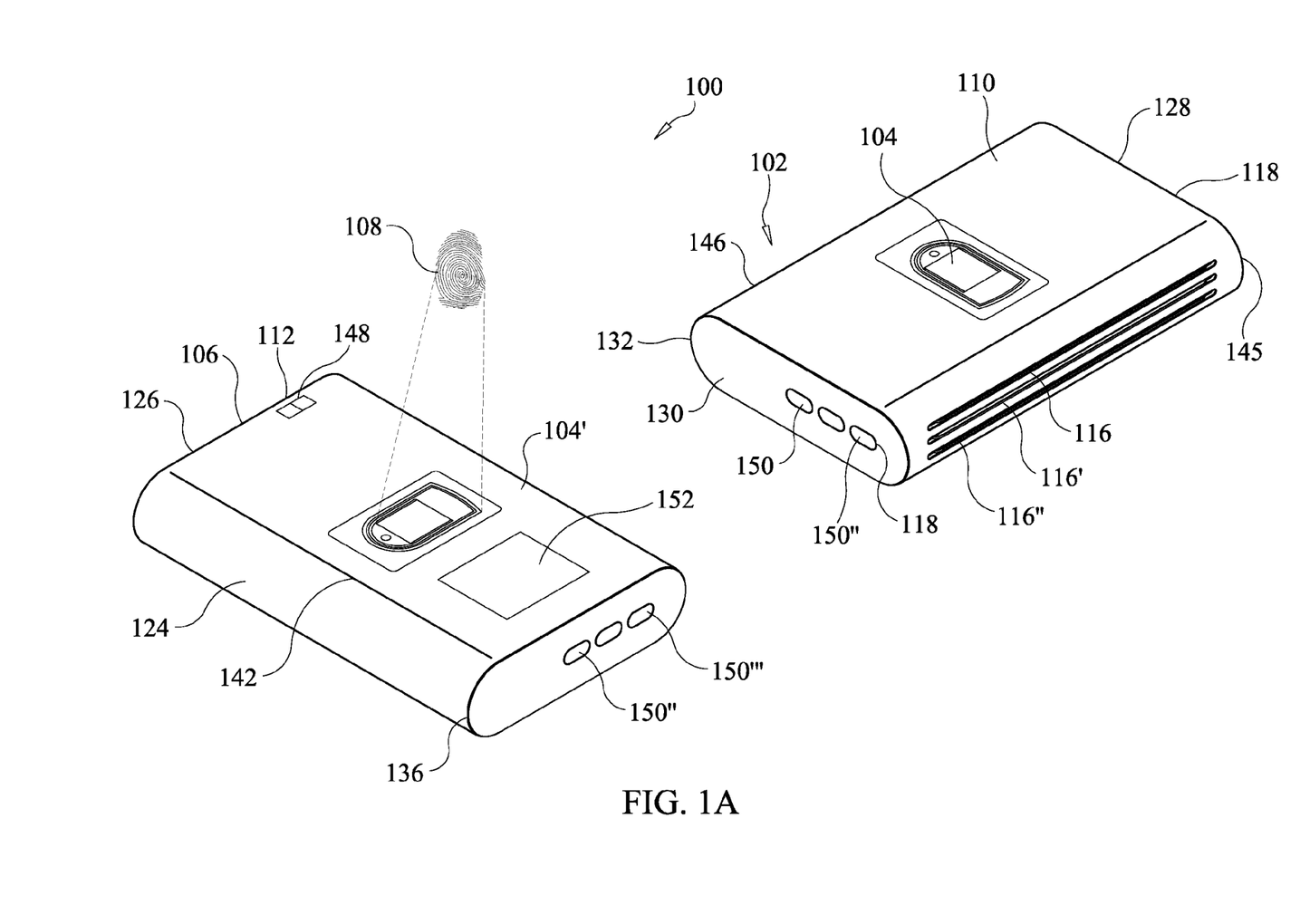
- FIGS. 1A & 1B show an exemplary embodiment of the apparatus according to one embodiment.
Figure 1B:
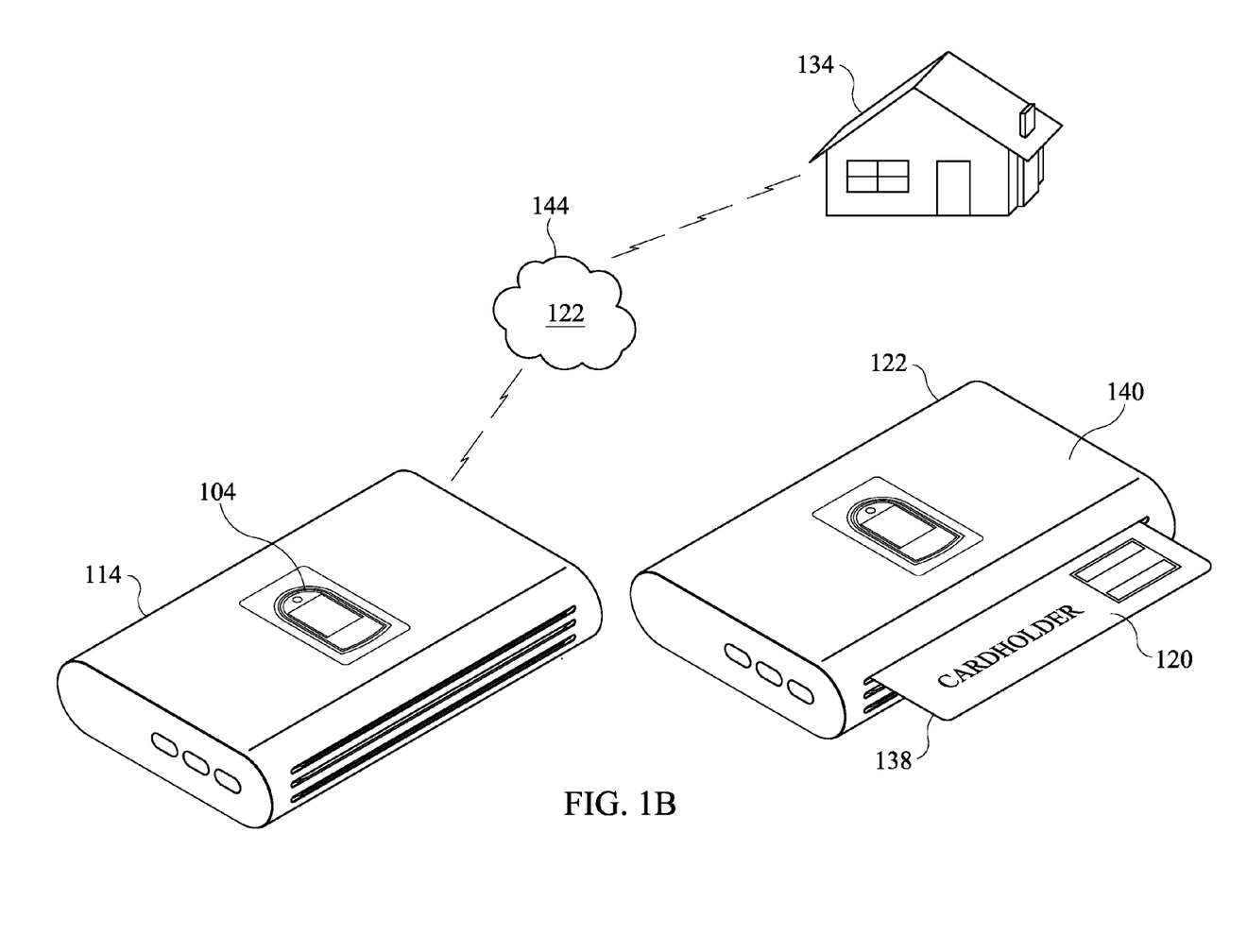

FIGS. 1A & 1B show an apparatus 100 in accordance with one embodiment. Apparatus 100 comprises of an electronic card case 102 with biometric verification means 104 positioned thereon that is in communication with at least one processor 106 positioned within, wherein the biometric verification means 104 is configured for validating at least one biometric sample 108 with at least one biometric identifier 110 stored on the electronic card case 102; a locator unit 112 in communication with the at least one processor 106 adapted for determining geographical location 114 of the electronic card case 102; at least one or more card slots 116, 116', 116' disposed within the electronic card case 102; a card release mechanism 118 that receives a selection of at least one electronic payment card 120 and releases the selected at least one electronic payment card 120 through the respective least one card slot 116 for the selected at electronic payment card 120, upon validation of the at least one biometric sample 108 with at least one or more biometric identifiers 110, 110' stored on the at least one processor 106; the at least one processor 106 configured for transforming the geographical location 114 into preauthorized location information 122 for the selected at least one electronic payment card 120; and communication means 124 connected to the at least one processor 106 triggered for transmitting the preauthorized location information 122 for the selected at least one electronic payment card 120 upon validation of the at least one biometric sample 108 and the release of the electronic payment card 120.

Electronic card case 102 may be constructed from plastic or metal or a combination of both and includes one or more card slots 116, 116', 116' dimensioned to retain and release at least one or more electronic payment cards 120, 120' housed therein. Electronic payment cards 120, 120' are selected from the group of electronic devices consisting essentially of programmable smart cards, memory cards, and processor cards with electronic data stored thereon that is accessible via a magnetic stripe or chip on the electronic payment card 120. In further embodiments, card case 102 may be formed of a material selected from the group consisting essentially of a plastic, a wood, a resin, a fiber, or a glass. Alternatively, card case 102 may be formed of any suitable material, and/or combination of suitable materials that retain a rigid shape having a smooth contour with no sharp edges that substantially surrounds the electronic card case 102 forming a housing 126 to entirely or partially encase any one or more of the following: at least one or more electronic payment cards 120, 120', 120"; at least one or more processors 106, 106' the locator unit 112, at least one communications means 124, at least one storage means 128, the at least one internal power source 130, and the at least one means for connecting to an external power source 132.

Electronic card case 102 includes biometric verification means 104 positioned thereon, configured for validating a card holder's biometric sample 108. Biometric sample 108 uniquely identifies the individual based on his/her intrinsic physical traits, e.g. fingerprints, retina scan, palm geometry, hand geometry, speech, and or other biometric identifiers 110, 110' that are used in the arts. Once the card holder submits a first valid biometric sample 108 it is enrolled as a biometric identifier 110, which may be stored on the electronic card case's at least one storage means 128 or at least one processor 106 for future reference and comparison and/or transmitted to the issuing banks 134, 134' of the payment cards 120, 120' being stored therein.

Biometric verification means 104 includes but is not limited to: fingerprint recognition means, hand geometry recognition means, palm geometry recognition means, iris recognition means, retina recognition means, speech recognition means and any other biometric verification means 104 that are known and used in the arts. Biometric verification means 104 may include at least one processor 106 disposed in communication with, for example, a fingerprint scanner, hand geometry scanner, a palm geometry scanner, iris scanner, retina scanner, or a user interface which may include an audio receiving circuit capable of receiving audio signals at predetermined frequencies and/or with additional hardware complete with electronic circuitry and such other biometric verification means 104 that are known and used in the arts. Illustratively, as seen in FIG. 1, the biometric verification means 104 includes a fingerprint scanner, where the processor 106 controls the functionality of the fingerprint scanner, generating the varied algorithms for storage of the first valid biometric sample 108 as a biometric identifier 110 and validates the images of subsequent biometric samples 108, 108' received from the electronic card case 102.

Processor 106 may be any type of processor, such as, but not limited to, a central processing unit (CPU), a microprocessor, a video processor, a front end processor, a coprocessor, a single-core processor, a multi-core processor, and the like. Processor 106 is a programmable unit comprising of computer executable instructions 136 readable and executable by the processor 106, thereby exerting digital control over the electronic card case 102, the electronic circuits within, and the various components thereof, e.g. the locator unit 112, biometric verification means 104, card release mechanism 118, communication means 124 and the like.

Computer executable instructions 136 may be any type of computer executable instructions, which may be in the form of a computer program, the program being composed in any suitable programming language or source code, such as C++, C, JAVA, JavaScript, HTML, XML, and other programming languages. Computer executable instructions 136 are readable and executable by the at least one processor 106 and may be embedded within the processor 106 or may be stored on the electronic card case's storage means 128. Computer executable instructions 136 are configured for performing any one or more of the following system functions: controlling the biometric verification means 104 for validating a biometric sample 114 with the biometric identifier 116 previously stored thereon; activating the electronic card case's release mechanism 118 upon validation of the at least one biometric sample 108 and the selection of the at least one electronic payment card 120; initiating the at least one locator unit 112 for determining the geographical location 114 of the electronic card case 102 and by extension the electronic payment cards 120, 120' and the like.

Storage means 128 may be a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Storage means 128 may be used to store information, such as at least one or more biometric identifiers 110, 110', the electronic card case's geographical location information 114 and by extension the payment cards 120, 120' housed within, use log, pre-authorized location information 122, electronic card case 102 information, including, but not limited to, model number, serial number or any other identifier for the electronic card case 102, list of registered payment cards 120, 120', payment card's account information 136, and the like. Payment card account information 138 may include but is not limited to any one or more of the following: customer service information, hours of operation, identifying numbers for the payment card 118, name of issuing bank 134, type of card, i.e. VISA, AMERICAN EXPRESS, etc., card holder's contact information 138 and the like. Card holder's information 140 as used herein may include but is not limited to any one or more of the following: card holder's name, card holder's address, country of domestic residence, pre-approved status to participate in this system 100, and method, country, date of birth, any other card holder information that an issuing bank may deem important enough to be stored on the electronic card case 102 or the payment card 120. Other data that may be stored thereon may include information for the issuing bank of the electronic card case 102, and the like. The information stored thereon may be retrieved from storage means 128 using the processor 106. In one embodiment, storage means 128 and the locator unit 112 may be connected to processor 106 via a circuit board. In some embodiments, the aforementioned connections may be electronic connections and/or mechanical connections. In the case of electronic connections, the electronic connections may be wired and/or wireless.

In some embodiments, locator unit 112 is in electrical communication with the at least one processor 106 such that the functionality of the locator unit 112 is centrally controlled by the processor 106. Processor 106 may also be used to activate the locator unit 112 for orienting itself and determining the location of the locator unit 112 and by extension the electronic card case 102 and all electronic payment cards 120, 120' stored within. Locator unit 112 calculates the geographical location 114 of the electronic card case 102 by triangulating the location of apparatus 100 based on at least one positioning system signal received by the locator unit 112.

In some embodiments, locator unit 112 may be positioned within electronic card case 102. In another embodiment, locator unit 112 may be positioned on or near an exterior 142 surface of the electronic card case 102. In yet another embodiment, locator unit 112 may be positioned outside, or external to electronic card case 102. In a further embodiment, locator unit 112 may be externally connected to electronic card case 102 by a connecting means, wherein connecting means may be a cable, such as, but not limited to, a coaxial cable, a universal serial bus (USB) cable, a network cable, an RCA cable, a steel cable, a fiber optic cable, and the like. In embodiments where locator unit 112 is externally connected to electronic card case 102, locator unit 112 may draw its power from a power source 130 within electronic card case 102 via wiring, or via means for connecting to an external power supply 132 such as a cable, such as a USB cable, or any other type of power connection, such as a socket, docking bay, and the like. Alternatively, locator unit 112 may include its own means for receiving power from an independent power supply, such as a power socket to be connected to a power cord and plugged into an electrical outlet. In some embodiments, locator unit 112 may be detachably connected to electronic card case 102, while in other embodiments, locator unit 112 may be undetachably connected to electronic card case 102.

In some embodiments, locator unit 112 may comprise, of or is the same as the communications means 124. Communications means 124 may be a wireless communications means, such as, but not limited to, a radio frequency transceiver, a radio frequency receiver, a local positioning system receiver, such as a Wi-Fi positioning system receiver, or a wireless modem, such as, but not limited to, a global system for mobile communications (GSM) modem and/or a radio frequency transmitter, including, but not limited to, a Bluetooth module or a Global Positioning System (GPS) transponder with transmitting and receiving means for communicating with either via a geosynchronous (GEO) or Low Earth Orbit (LEO) satellite in a network 144 to determine for example the electronic card case's 102 geographical coordinates and by extension the payment cards 120, 120'. Locator unit 112 orients itself and determines its geographical location 114, i.e. its longitude and latitude coordinates by searching for signals of GPS satellite constellation, verifying whether it has direct access to a wireless communications network system 138, e.g. a satellite network 144 system, and if so, it determines the geographical location 114 of the locator unit 112 and consequently the electronic card case 102 and all the electronic payment cards 120, 120' positioned within.

In some embodiments, determining the geographical location 114 of the electronic card case 102 includes determining the latitudinal and longitudinal coordinates of its current geographical position, such as, the apparatus' locator unit 112 receiving a signal, such as a location determination signal, from a positioning system, such as a global positioning system (GPS), or local positioning system, such as a Wi-Fi positioning system, which may originate from a satellite, or a ground based antenna. The electronic card case's processor 106 transforms the geographical location information 114 for the electronic card case 102 and by extension all electronic payment cards 120, 120', 120" housed within, into pre-authorized location information 122 for the selected payment card 120, which now includes the card's geographical location 114 and identifying card account information 138.

In another embodiment, locator unit 112 may comprise a radio frequency identification tag (RFID tag) 146. Such a RFID tag 146 may be used by a positioning system, such as any of the embodiments described directly above and elsewhere throughout the present disclosure, to determine the geographical location 114 of the locator unit 112. The RFID tag 146 may be any kind of RFID tag 146 that are well known and used in the arts, such as, but not limited to, an active RFID tag 146 and/or a passive RFID tag 146.

In yet another embodiment, the electronic card case 102 may comprise an activation switch 148 electronically connected to locator unit 112. The activation switch 148 may be any kind of switch, such as an electronic switch. In some embodiments, the activation switch 148 may be activated by a radio signal, which may include a radio frequency beam. In other embodiments, the activation switch 148 may be activated if and/or when electronic card case 102 is disconnected from an external power source. In some embodiments, the activation switch 148 may operate to activate the locator unit 112, so as to preserve the power supply level while the locator unit 112 is inactive, should the locator unit 112 be battery 130 powered.

In some embodiments, electronic card case 102 may comprise at least one internal power source 130, such as a battery 130, which serves as a power source to power the electronic card case 102 and the functionality of various components therein, e.g. the processor 106, card release mechanism 118. In some embodiments, electronic card case 102 is adapted with at least one means for connecting to an external power source 132, which may comprise of electrical contacts for establishing wired and/or wireless connectivity. The at least one means for connecting to an external power source 132 may be also be a power terminal, a socket, a wire, a port, a contact, or the like. In that event, processor 106 detects when the electronic card case 102 has been disconnected from an external power source and switches electronic card case 102's power source to an internal power source 130, such as the battery 130.

Card retain and release mechanism ("card release mechanism") 118 comprise in part of release buttons 150, 150', 150" that are positioned on the electronic card case's exterior 142, which upon validation of the biometric sample 108, once depressed, releases the electronic payment card 120 corresponding to the depressed release button 150 from the card slot 116 where it was being retained. Card release mechanism 118 describes any retain and release mechanisms that are well known and used in the arts for retaining and/or releasing electronic cards from slots. Card release mechanism 118 is responsive to the signals generated by depressing the release button 150 which causes the electronic circuit that is in communication with the processor 106 to generate an electronic signal, driving the mechanical components of the card release mechanism 118 within the electronic card case 102 to eject the selected payment card 120 from the housing 126. During ejection of the selected payment card 120, it moves from the interior region of the electronic card case's housing 126 through the card slot 116 to a region exterior to the housing 126. In an exemplary embodiment of the electronic card case 102, there are three card slots 116, 116'. However, it is understood that the invention may be practiced with a singular card slot 116 for one electronic payment card 120 or a plurality of slots 116, 116', 116" for a plurality of electronic payment cards 120, 120', 120". In some embodiments, each release button 150 or card slot 116 may include backlighting in different colors, confirming the releasability of the electronic payment card 120. For example, if the biometric sample 108 matches the biometric identifier 110 stored thereon, the card slot 116 or the release button 150 corresponding to the selected data card 120 may be connected to displaying means 152, which may include a Light Emitting Diode ("LED") display to show for example a green backlight, while a non-matching biometric sample 108 may cause either the card slot 116 or the release button 150 to be illuminated with a red light.

Displaying means 152 as used herein may be any kind of display means, such as, but not limited to, an liquid crystal display ("LCD") or light emitting diode ("LED") type, plasma, touch screen or other types of displays that are well known and used in the arts. Displaying means 152 may be used to display information concerning the battery life, information concerning the electronic card case 102 and/or electronic payment card 120 e.g. customer service information for the selected electronic payment card 120, customer service hours, advertisements, information regarding the locator unit 112, geographical information, pre-approval status for participation in the system 10 and method described herein and the like.

Figure 2:
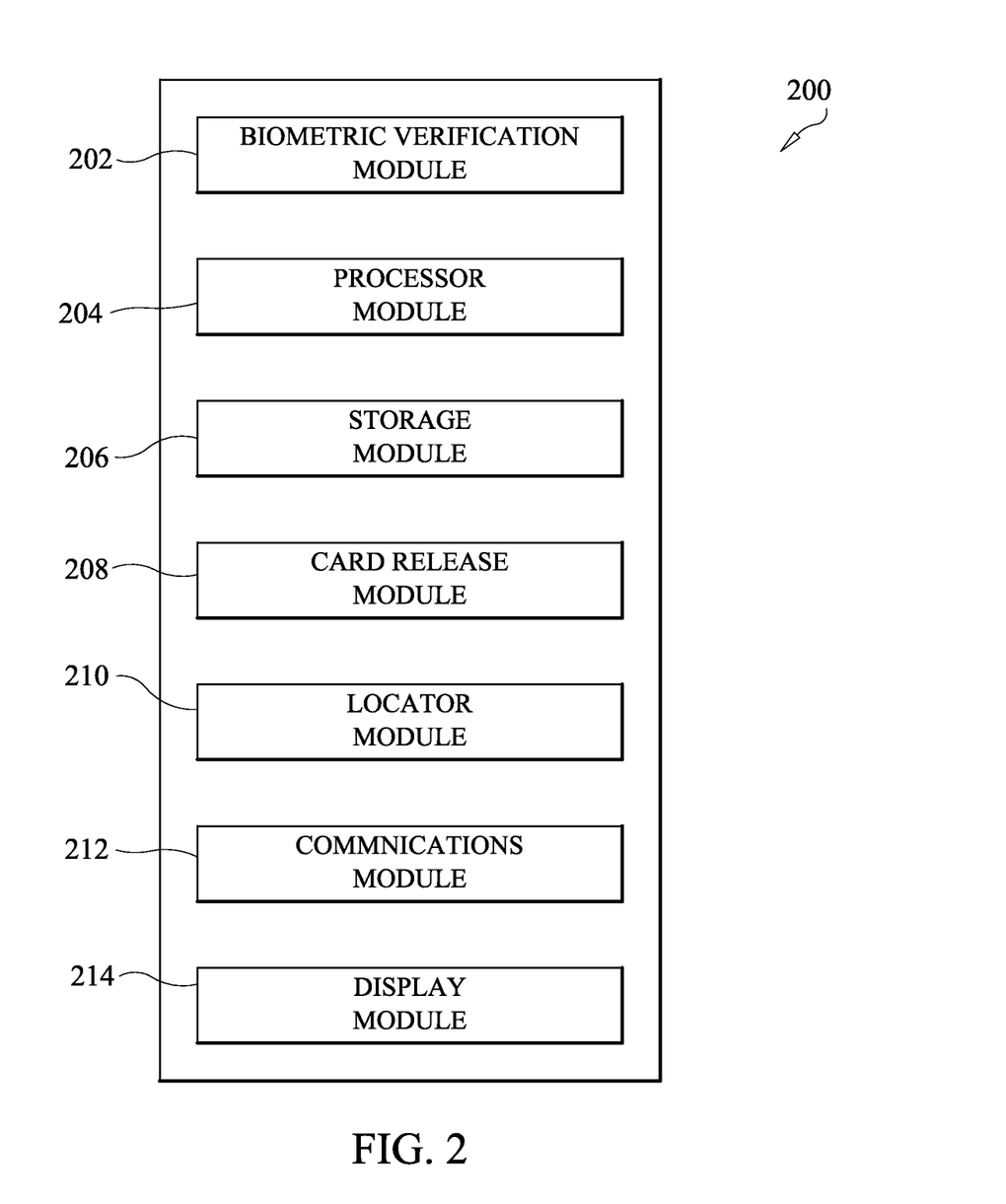
FIG. 2 shows a block diagram representing a system in accordance with one embodiment.

FIG. 2 shows a block diagram representing a system 200 in accordance with one embodiment. System 200 comprises of an electronic card case 102 that includes a biometric verification module 202 in communication with a processor module 204 configured for validating a payment card holder's biometric sample 108 by comparing the biometric sample 108 with the biometric identifier 110 stored thereon. The term "module" as used throughout this disclosure refers to a unit of distinct functionality that may be presented in software, hardware, or combinations thereof. When the functionality of a module is performed in any part through software, the module includes a machine readable medium.

In one embodiment, biometric verification module 202 may comprise a software aspect, such as a computer program comprising of computer executable instructions 136 configured for comparing the biometric sample 108 with the biometric identifier 110 stored on the electronic card case 102.

In another embodiment, biometric verification module 202 may comprise a hardware aspect, including but not limited to a processor 106 which may include a processor module 204 in communication with for example a fingerprint scanner, hand geometry scanner, a palm geometry scanner, iris scanner, retina scanner, or a user interface which may include an audio receiving circuit capable of receiving audio signals at predetermined frequencies and/or with additional hardware complete with electronic circuitry and such other biometric scanning hardware that are known and used in the arts. In yet another embodiment, biometric verification module 202 may comprise both hardware and software aspects, such as those described directly above and elsewhere throughout the present disclosure.

In one embodiment, processor module 204 may comprise a hardware aspect such as a computer processor, including, but not limited to, any of those previously described with reference to the embodiments described throughout the present disclosure. In another embodiment, processor module 204 may comprise a software aspect, such as, but not limited to, a computer program comprising computer executable instructions 136, such as an operating system, biometric verification software, electronic card release software, communications software, and the like. In yet another embodiment, processor module 204 may comprise both hardware and software aspects, such as those described directly above and elsewhere throughout the present disclosure.

Computer executable instructions 136 may be any type of computer executable instructions, which may be in the form of a computer program, the program being composed in any suitable programming language or source code, such as C++, C, JAVA, JavaScript, HTML, XML, and other programming languages. Computer executable instructions 136 are readable and executable by the at least one processor module 204 and may be embedded within the processor 106 or may be stored on the electronic card case's storage module 206. Processor modules' computer executable instructions 136 are configured for performing any one or more of the following system functions: controlling the biometric verification module 202 for validating a biometric sample 114 with the biometric identifier 116 previously stored thereon; activating the electronic card case's release module 208 upon validation of the at least one biometric sample 108 and the selection of the at least one electronic payment card 120; initiating the at least one locator module 210 for determining the geographical location 114 of the electronic card case 102 and by extension the electronic payment cards 120, 120' and the like. Processor module 204 is also configured for transforming the geographical location 114 into preauthorized location information 122 for the selected at least one electronic payment card 120.

System 200 further comprises a storage module 206 to store information thereon. In various embodiments of system 200, such information may include, but is not limited to, at least one or more biometric identifiers 110, 110', the electronic card case's geographical location information 114 and by extension the payment cards 120, 120' housed within, use log, pre-authorized location information 122, electronic card case 102 information, list of registered payment cards 120, 120', payment card's account information 136 which includes any one or more of the following: customer service information, hours of operation, identifying numbers for the payment card 118, name of issuing bank 134, type of card, i.e. VISA, AMERICAN EXPRESS, etc., card holder's contact information 138 and the like. Card holder's information 140 as used herein may include but is not limited to any one or more of the following: card holder's name, card holder's address, country of domestic residence, pre-approved status to participate in this system 100, and method, country, date of birth, any other card holder information that an issuing bank may deem important enough to be stored on the electronic card case 102 or the payment card 120. Other data that may be stored thereon may include information for the issuing bank of the electronic card case 102, and the like. The information stored thereon may be retrieved from storage means 128 using the processor 106. In one embodiment, storage means 128 and the locator unit 112 may be connected to processor 106 via a circuit board. In some embodiments, the aforementioned connections may be electronic connections and/or mechanical connections. In the case of electronic connections, the electronic connections may be wired and/or wireless.

In one embodiment, storage module 206 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, storage module 206 may possess a software aspect, such as, but not limited to, database building software, file management software, and the like. In yet another embodiment, storage module 206 may comprise both hardware and software aspects, such as those described directly above and elsewhere throughout the present disclosure.

Embedded within the processor module 204 are computer executable instructions 136 readable and executable by the at least one processor module 204, where the computer executable instructions 136 are operative to perform the varied system functions of the electronic card case 102. Computer executable instructions 136 may be any type of computer executable instructions 136, which may be in the form of a computer program, the program being composed in any suitable programming language or source code, such as C++, C, JAVA, JavaScript, HTML, XML, and other programming languages. The computer executable instructions 136 may be stored on a non-transitory medium, such as a hard drive, a solid state drive, a disc, and the like. The computer executable instructions 136 may be in a transitory medium, such as a signal, electrical wave, or radio-frequency wave.

In one embodiment, the computer executable instructions 136 are configured for using the locator module 210 that is in communication with the at least one processor module 204 for determining geographical location 114 of the electronic card case 102 and by extension the payment cards 120, 120' stored within. As such, the functionality of the locator module 210 is centrally controlled by the processor module 204. Locator module 210 may comprise of both hardware and/or software aspects. Processor module 204 may also be used to activate the locator module 210 for orienting itself and determining the location of the locator module 210 and by extension the electronic card case 102 and all electronic payment cards 120, 120' stored within. Locator module 210 calculates the geographical location 114 of the electronic card case 102 by triangulating the location of apparatus 100 based on at least one positioning system signal received by the locator module 210.

In some embodiments, locator module 210 may comprise, of hardware aspects and may be the same as a communications module 212. Communications module 212 may comprise of include means for communicating wirelessly and include but is not limited to, a radio frequency transceiver, a radio frequency receiver, a local positioning system receiver, such as a Wi-Fi positioning system receiver, or a wireless modem, such as, but not limited to, a global system for mobile communications (GSM) modem and/or a radio frequency transmitter, including, but not limited to, a Bluetooth module or a Global Positioning System (GPS) transponder with transmitting and receiving means for communicating with either via a geosynchronous (GEO) or Low Earth Orbit (LEO) satellite in a network 144 to determine for example the electronic card case's 102 geographical coordinates and by extension the payment cards 120, 120'. Locator module 210 orients itself and determines its geographical location 114, i.e. its longitude and latitude coordinates by searching for signals of GPS satellite constellation, verifying whether it has direct access to a wireless communications network system 138, e.g. a satellite network 144 system, and if so, it determines the geographical location 114 of the locator module 210 and consequently the electronic card case 102 and all the electronic payment cards 120, 120' positioned within. Communication module 212 that is connected to the at least one processor module 204 is triggered for transmitting the preauthorized location information 122 for the selected at least one electronic payment card 120 upon validation of the at least one biometric sample 108 and the release of the selected at least one electronic payment card 120.

In some embodiments, determining the geographical location 114 of the electronic card case 102 includes determining the latitudinal and longitudinal coordinates of its current geographical position, such as, the apparatus' locator module 210 receiving a signal, such as a location determination signal, from a positioning system, such as a global positioning system (GPS), or local positioning system, such as a Wi-Fi positioning system, which may originate from a satellite, or a ground based antenna. The electronic card case's processor 106 transforms the geographical location information 114 for the electronic card case 102 and by extension all electronic payment cards 120, 120', 120" housed within, into pre-authorized location information 122 for the selected payment card 120, which now includes the card's geographical location 114 and identifying card account information 138.

In another embodiment, locator module 210 may be in electronic communication with a radio frequency identification tag (RFID tag) 146. Such a RFID tag 146 may be used by a positioning system, such as any of the embodiments described directly above and elsewhere throughout the present disclosure, to determine the geographical location 114 of the locator module 210. The RFID tag 146 may be any kind of RFID tag 146 that are well known and used in the arts, such as, but not limited to, an active RFID tag 146 and/or a passive RFID tag 146.

Locator module 210 may also include e.g. a GPS transponder, for determining the location of the electronic card case 102 with means for encoding the location into an electronic signal 120 using the processor module 204, wherein the electronic signal is transmitted to the issuing bank 134 of the payment card 108 being used, and the transmitted electronic signal 120 is decoded such that the location of the electronic card case 102 assumed to be in possession of the card holder is currently located and/or international use activity may be monitored and authorized in real-time. Therefore, the location of the electronic card case 102 and consequently the location of the payment card holder may be determined in real-time via global satellite system, where the information, i.e. the longitude and latitude coordinates, may be stored in the GPS location information 122.

System 200 further comprises a card retain and release module 208 ("card release module") 118. Card release module 208 may comprise of software and hardware aspects, and is in electronic communication with the processor module 204 which controls the software and hardware aspects of the card release module 208. Card release module 208 may comprise in part of hardware aspects such as release buttons 150, 150', 150" that are positioned on the electronic card case's exterior 142, which that receives a selection of at least one electronic payment card 120 and upon validation of the biometric sample 108, releases the selected electronic payment card 120 corresponding to the depressed release button 150 from the corresponding card slot 116 where it was being retained. Card release module 208 is responsive to the signals generated by depressing the release button 150 which causes the electronic circuit that is in communication with the processor module 204 to generate an electronic signal, driving the hardware aspects of the card release module 208 within the electronic card case 102 to eject the selected payment card 120 from the housing 126. During ejection of the selected payment card 120, it moves from the interior region of the electronic card case's housing 126 through the card slot 116 to a region exterior to the housing 126. In some embodiments, each release button 150 or card slot 116 may include backlighting in different colors, confirming the releasability of the electronic payment card 120. For example, if the biometric sample 108 matches the biometric identifier 110 stored thereon, the card slot 116 or the release button 150 corresponding to the selected data card 120 may be connected to a display module 214, which may include an LED display to show for example a green backlight, while a non-matching biometric sample 108 may cause either the card slot 116 or the release button 150 to be illuminated with a red light. The housing 126 is dimensioned to entirely or partially encase any one or more of the following: at least one or more electronic payment cards 120, 120', 120"; at least one or more processors 106, 106' the locator unit 112, at least one communications means 124, at least one storage means 128, the at least one internal power source 130, and the at least one means for connecting to an external power source 132.

System 200 further comprises a display module 214 that may comprise of software and hardware aspects. Display module 214 is in electronic communication with the processor module 204 which controls the software and hardware aspects of the display module 214. Such hardware aspects may include any kind of means for electronic displays, such as, but not limited to, an LCD or LED type, plasma, touch screen or other types of displays that are well known and used in the arts. Display module 214 may be used to display information concerning the battery life, information concerning the electronic card case 102 and/or electronic payment card 120 e.g. customer service information for the selected electronic payment card 120, customer service hours, advertisements, information regarding the locator unit 112, geographical information, pre-approval status for participation in the system 10 and method described herein and the like.

Methods

Figure 3:
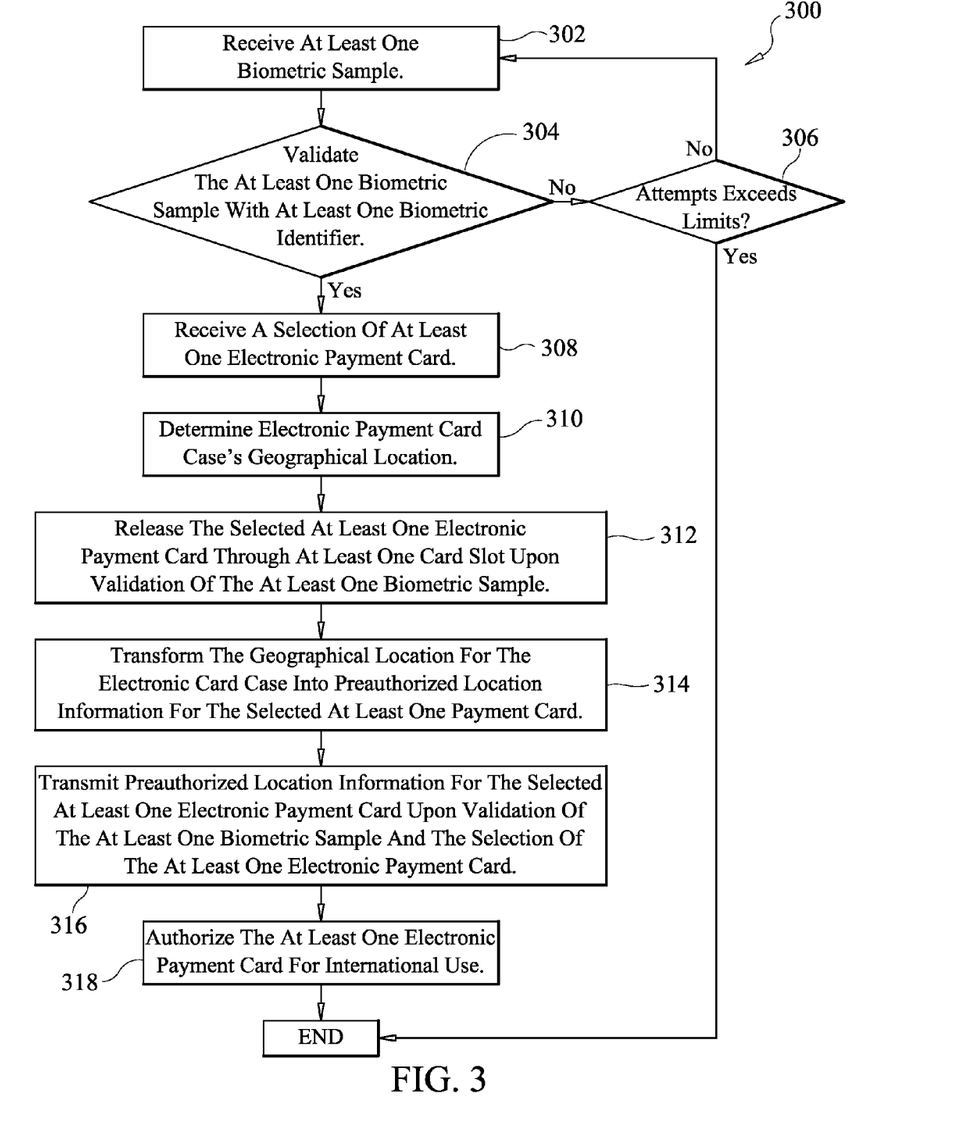
FIG. 3 is a sample flowchart of an exemplary method of authorizing a payment card 120 for international use using the electronic card case.

FIG. 3 is a sample flowchart of an exemplary method 300 of authorizing a payment card 120 for international use using the electronic card case 102. Electronic card case 102 includes biometric verification means 104 positioned thereon that is in communication with at least one processor 106 positioned within. Processor 106 is a programmable unit comprising of computer executable instructions 136 readable and executable by the processor 106, thereby exerting digital control over the electronic card case 102, the electronic circuits within, and the various components thereof, e.g. biometric verification means 104, the locator unit 112, card release mechanism 118, communication means 124 and the like.

Computer executable instructions 136 may be any type of computer executable instructions, which may be in the form of a computer program, the program being composed in any suitable programming language or source code, such as C++, C, JAVA, JavaScript, HTML, XML, and other programming languages. Computer executable instructions 136 are readable and executable by the at least one processor 106 and may be embedded within the processor 106 or may be stored on the electronic card case's storage means 128. Computer executable instructions 136 are configured for performing any one or more of the following system functions: controlling the biometric verification means 104 for validating a biometric sample 114 with the biometric identifier 116 previously stored thereon; activating the electronic card case's release mechanism 118 upon validation of the at least one biometric sample 108 and the selection of the at least one electronic payment card 120; initiating the at least one locator unit 112 for determining the geographical location 114 of the electronic card case 102 and by extension the electronic payment cards 120, 120' and the like.

Method 300 includes receiving at least one biometric sample 104 (step 302) for the electronic card case 102 and validating the at least one biometric sample 104 with the biometric identifier 114 stored thereon (step 304) to see if the biometric sample matches 104 and is therefore valid. If the biometric sample 108 fails to match the biometric identifier 110 method 300 proceeds to step 306 to determine if the predetermined number of attempts have been exceeded (step 306). If not, method 300 loops back to step 302 until either the predetermined number of attempts have been exceeded, in which case card holder will need to follow the issuing bank's protocol to handle that contingency, which might include contacting the issuing bank 134 directly. Alternatively, method 300 will proceed to step 308 because the biometric sample 108 matched the stored biometric identifier 110. Since the biometric identifier 110 stored thereon is unique to the card holder, if the biometric sample 104 matches the biometric identifier 114 stored thereon, then the issuing bank 134 can rest assured that the card holder is in actual possession of the electronic payment card 120 and therefore no further identification verification is needed to proceed with the financial transaction.

Similarly, if the biometric sample 104 matches the biometric identifier 110, then the card holder may select at least one of the electronic payment cards 120, 120' stored within the electronic card case 102 by depressing, for example, a corresponding release button 108 for the ejectment of the electronic payment card 120. Method 300 further comprises receiving a selection of at least one electronic payment card 120 (step 308).

Method 300 further comprises determining electronic payment card case's geographical location 112 (step 310). In some embodiments, the locator unit 112 is constantly orienting itself to determine its geographical location 112, while in other embodiments, the locator unit 112 only orients itself after the biometric verification means 104 is engaged. In either embodiment, once the biometric verification means 104 is engaged, the locator unit 112 orients itself and determines its geographical location (step 310). The locator unit 112 calculates the geographical location of the electronic card case 102 and by extension the electronic payment cards 120, 120', 118" located within by triangulating the location of apparatus 100 based on at least one positioning system signal received by the locator unit 112. Locator unit 112 may be the same as communications means 124. Communications means 124 may be a wireless communications means, such as, but not limited to, a radio frequency transceiver, a radio frequency receiver, and/or a radio frequency transmitter, including, but not limited to, a Bluetooth module or a Global Positioning System (GPS) transponder with transmitting and receiving means for communicating with either via a geosynchronous (GEO) or Low Earth Orbit (LEO) satellite in a network 144 to determine for example the electronic card case 102 geographical coordinates. Locator unit 112 orients itself and determines its geographical position, e.g. longitude and latitude coordinates by searching for signals of GPS satellite constellation, verifying whether it has direct access to a wireless communications network system 128, e.g. a satellite network system, and if so, it determines the geographical location of the locator unit 112 and consequently the electronic card case 102 and all the electronic payment cards 120, 120' positioned within. In some embodiments, locator unit 112 is in electrical communication with the at least one processor 106 such that the functionality of the locator unit 112 is centrally controlled by the processor 106.

Method 300 further comprises the card release mechanism 118 releasing the selected at least one electronic payment card 120 through it's at least one respective card slot 116 upon validation of the at least one biometric sample 108 (step 312). The card slots 116, 116', 116" positioned within the electronic payment card 18 are dimensioned and oriented to retain and release the electronic payment card 120.

Method 300 further comprises transforming the geographical location 112 for the electronic card case 102 into preauthorized location information 122 for the selected at least one payment card 120 (step 314) by linking the geographical location 114 for the electronic payment card 120 and/or the electronic card case 102 with identifying payment card account information 138 for the selected at least one electronic payment card 120 such that the issuing bank for the electronic payment card 120 can readily identify the account holder and account for pre-authorization of the electronic payment card 120 for international use. Once the geographical location 112 for the electronic card case 102 has been transformed into preauthorized location information 122 it is ready for transmission to the issuing bank for the electronic payment card. Method 300 further comprises transmitting preauthorized location information 122 for the selected at least one electronic payment card 120 upon validation of the at least one biometric sample 108 and the selection of the at least one electronic payment card 120 (step 316).

Method 300 further comprises the issuing bank's server receiving pre-authorized location information 122 for the selected at least one electronic payment card 120, and as such receiving notification of the card holder's whereabouts and verification of the identity of the card holder and the impending financial transaction. In this manner, the issuing bank 134 is assured that the international transaction is being conducted by the card holder and as such, pre-approves the transaction by authorizing the at least one electronic payment card 120 for international use (step 318). This negates the necessity of lengthy telephone calls to authenticate the card holder, which can be cumbersome, costly and inefficient when dealing with two different time zones.

In some embodiments method 300 further comprises substantially housing within the electronic card case 102 any one or more of the following: at least one or more electronic payment cards 120, 120', 120"; at least one or more processors 106, 106' the locator unit 112, at least one communications means 124, at least one storage means 128, the at least one internal power source 130, and the at least one means for connecting to an external power source 132.

In some embodiments, electronic card case 102 also includes displaying means 152 which may include a Light Emitting Diode ("LED") for displaying for example a green backlight, while a non-matching biometric sample 108 may cause either the card slot 116 or the release button 150 to be illuminated with a red light.

Displaying means 152 as used herein may be any kind of display means, such as, but not limited to, an liquid crystal display ("LCD") or light emitting diode ("LED") type, plasma, touch screen or other types of displays that are well known and used in the arts. Displaying means 152 are configured for displaying information concerning the battery life, information concerning the electronic card case 102 and/or electronic payment card 120 e.g. customer service information for the selected electronic payment card 120, customer service hours, advertisements, information regarding the locator unit 112, geographical information, pre-approval status for participation in the system 10 and method described herein and the like.

Hardware and Operating Environment

This section provides an overview of exemplary hardware and the operating environments in conjunction with which embodiments of the inventive subject matter can be implemented.

A software program may be launched from a computer readable medium in a computer-based system 100, 200 to execute the functions defined in the software program. Various programming languages may be employed to create software programs designed to implement and perform the method 300 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
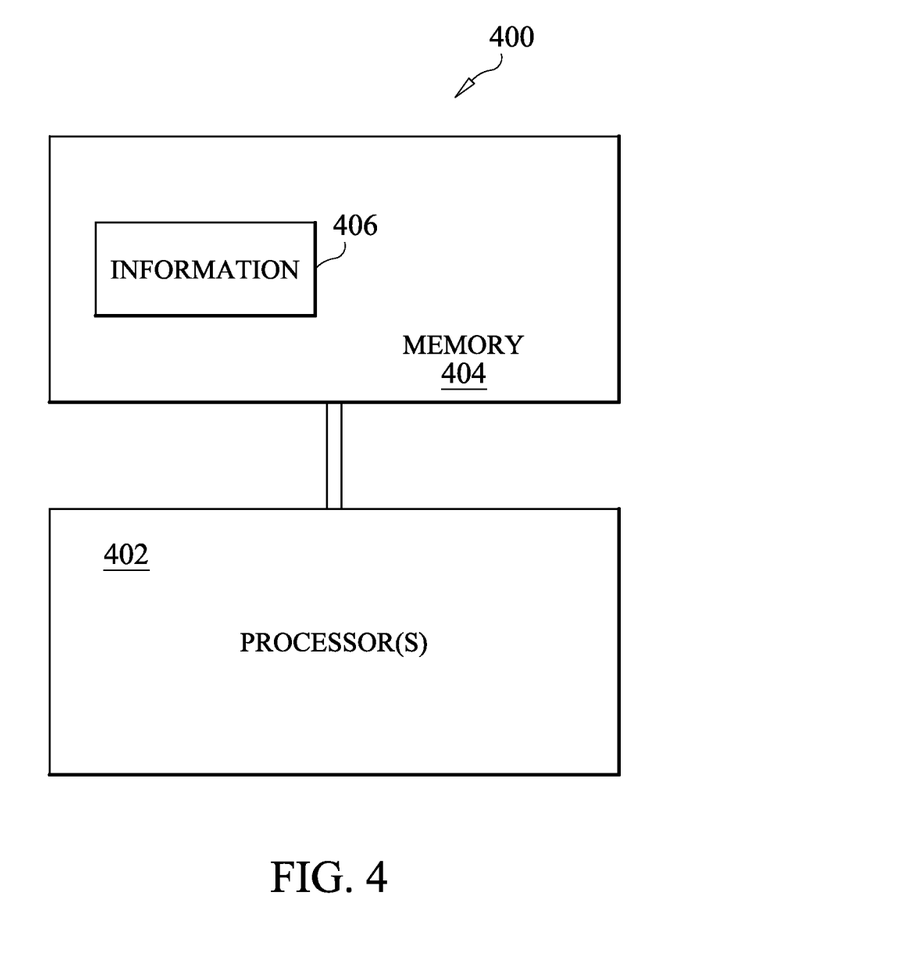
FIG. 4 is a block diagram representing an apparatus according to various embodiments.

FIG. 4 is a block diagram representing an apparatus 100 according to various embodiments. Such embodiments may comprise a computer, a memory means 402, a magnetic or optical disk, some other storage device, or any type of electronic device or system. The apparatus 400 may include one or more processor(s) 404 coupled to a machine-accessible medium such as memory means 402 (e.g., a memory including electrical, optical, or electromagnetic elements). The medium may contain associated information 406 (e.g., computer program instructions, data, or both) which, when accessed, results in a machine (e.g., the processor(s) 404) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. An apparatus comprising:
   an electronic card case with biometric verification means positioned thereon in communication with at least one processor positioned therein, wherein the biometric verification means is enabled for validating at least one biometric sample with at least one biometric identifier stored on the electronic card case, and upon validation causes activation of a locator unit positioned within the electronic card case;
   the locator unit, in communication with the at least one processor, enabled for determining geographical location of at least one electronic payment card as determined by geographical location of the electronic credit card case;
   the at least one processor configured for transforming the geographical location into preauthorized location information for the selected at least one electronic payment card;
   at least one card slot disposed within the electronic card case; and
   a card release mechanism that receives a selection of the at least one electronic payment card and releases the selected at least one electronic payment card through the at least one card slot upon validation of the at least one biometric sample, triggering the electronic card case's communication means for transmitting the preauthorized location information for a proposed payment card transaction, authorizing use before the electronic payment card is read for payment for the card transaction.

2. The apparatus of claim 1 further comprising computer executable instructions readable and executable by the at least one processor and configured for:
   controlling the biometric verification means for validating a biometric sample with the biometric identifier previously stored thereon; and
   activating the electronic card case's release mechanism upon validation of the at least one biometric sample and the selection of the at least one electronic payment card.

3. The apparatus of claim 1, wherein the at least one locator unit is any one of the following: a global positioning system transponder that orients itself and determines the electronic card case's geographical location.

4. The apparatus of claim 1, further comprising housing for the at least one electronic card case operative to entirely or partially encase any one or more of the following: the at least one electronic payment card; the at least one processor, the at least one locator unit, the at least one communications means, at least one storage means, at least one internal power source, and at least one means for connecting an external power source.

5. The apparatus of claim 1, further comprising at least one display means for displaying any one or more of the following: battery life information, customer service information, advertisements, locator unit information and geographical location.

6. The apparatus of claim 1 further comprising an activation switch connected to the at least one locator unit, and wherein the activation switch is operative to activate the at least one locator unit upon receiving an activation radio signal, or upon an external power source being disconnected from the at least one means for connecting an external power source.

7. The apparatus of claim 1, further comprising a radio frequency identification tag used to determine the geographical location of the locator unit.

8. The apparatus of claim 7, wherein the radio frequency identification tag may be any kind of radio frequency identification tag such as, but not limited to, an active radio frequency identification tag or a passive radio frequency identification tag.

9. The apparatus of claim 1, wherein the pre-authorized location information includes the card's geographical location and identifying payment card account information.

10. The apparatus of claim 9, wherein the payment card account information include any one or more of the following: customer service information, hours of operation, identifying numbers for the payment card, name of issuing bank, type of card, and card holder's contact information.

11. The apparatus of claim 10, wherein card holder's contact information include any one or more of the following: card holder's name, card holder's address, country of domestic residence, pre-approved status for participation, country, and date of birth.

12. A system comprising:
    an electronic card case that includes a biometric verification module in communication with a processor module configured for validating a payment card holder's biometric sample by comparing the biometric sample with the biometric identifier stored thereon;
    a locator module in communication with the at least one processor module, both positioned within the electronic card case, and wherein the locator module is enabled for determining geographical location of at least one electronic payment card, determined by geographical location of the electronic credit card case;
    the at least one processor module configured for transforming the geographical location into preauthorized location information for the selected at least one electronic payment card;
    at least one card slot disposed within the electronic card case; and
    a card release module that receives a selection of at least one electronic payment card and releases the selected at least one electronic payment card through the at least one card slot upon validation of the at least one biometric sample, triggering the electronic card case's communication module for transmitting the preauthorized location information for a proposed payment card transaction, authorizing use before the electronic payment card is read for payment for the card transaction.

13. The system of claim 12 further comprising computer executable instructions readable and executable by the at least one processor and configured for:
    controlling the biometric verification module for validating a biometric sample with the biometric identifier previously stored thereon; and
    activating the electronic card case's release module upon validation of the at least one biometric sample and the selection of the at least one electronic payment card.

14. The system of claim 12, wherein the at least one locator module includes any one of the following: a global positioning system transponder that orients itself and determines the electronic card case's geographical location.

15. The system of claim 12, further comprising housing for the at least one electronic card case operative to entirely or partially encase any one or more of the following: the at least one electronic payment card; the at least one processor, the at least one locator unit, the at least one communications means, at least one storage means, at least one internal power source, and at least one means for connecting an external power source.

16. The system of claim 12, further comprising at least one display module for displaying any one or more of the following: battery life information, customer service information, advertisements, locator unit information and geographical location.

17. The system of claim 12, further comprising the locator module in electronic communication with a radio frequency identification tag used to determine the geographical location of the locator unit.

18. The system of claim 17, wherein the radio frequency identification tag may be any kind of radio frequency identification tag such as, but not limited to, an active radio frequency identification tag or a passive radio frequency identification tag.

19. The system of claim 12, wherein the pre-authorized location information includes the card's geographical location and identifying payment card account information.

20. The system of claim 19, wherein the payment card account information include any one or more of the following: customer service information, hours of operation, identifying numbers for the payment card, name of issuing bank, type of card, and card holder's contact information.

21. The system of claim 20, wherein card holder's contact information include any one or more of the following: card holder's name, card holder's address, country of domestic residence, pre-approved status for participation, country, and date of birth.

22. A method comprising:
receiving at least one biometric sample;
validating the at least one biometric sample with at least one biometric identifier stored thereon;
receiving a selection of at least one electronic payment card;
determining electronic payment card's geographical location determined by a determining of an electronic card case's geographical location by a locator module positioned within the electronic card case;
releasing the selected at least one electronic payment card through at least one card slot upon validation of the at least one biometric sample;
transforming the geographical location for the electronic card case into preauthorized location information for the selected at least one payment card; and
triggering the electronic card case's communication module for transmitting the preauthorized location information for a proposed payment card transaction, authorizing use before the electronic payment card is read for payment for the card transaction.

23. The method of claim 22, wherein the step of transforming the geographical location further comprises linking the geographical location for the electronic payment card with identifying payment card account information for the selected at least one electronic payment card.

24. The method of claim 22, further comprising:
controlling the biometric verification means for validating a biometric sample with the biometric identifier previously stored thereon;
activating the card release mechanism upon validation of the at least one biometric sample and the selection of the at least one electronic payment card.

25. The method of claim 22, further comprising orienting and determining the electronic card case's geographical location.

26. The method of claim 25, wherein the at least one locator unit is any one of the following: a global positioning system module and a wireless network positioning system module.

27. The method of claim 22, further comprising housing substantially within the at least one electronic card case any one or more of the following: the at least one electronic payment card; the at least one processor, the at least one locator unit, the at least one communications means, at least one storage means, at least one internal power source, and at least one means for connecting an external power source.

28. The method of claim 22, further comprising displaying any one or more of the following: battery life information, customer service information, advertisements, locator unit information and geographical location on at least one display means.

29. The method of claim 22, further comprising activating the at least one locator unit upon receiving an activation radio signal, or upon an external power source being disconnected from the at least one means for connecting an external power source.

30. The method of claim 22, wherein the pre-authorized location information includes the card's geographical location and identifying payment card account information.

31. The method of claim 30, wherein payment card account information include any one or more of the following: customer service information, hours of operation, identifying numbers for the payment card, name of issuing bank, type of card, and card holder's contact information.

32. The method of claim 31, wherein card holder's contact information include any one or more of the following: card holder's name, card holder's address, country of domestic residence, pre-approved status for participation, country, and date of birth.

* * * * *